United States Patent
Liou et al.

(10) Patent No.: US 9,363,559 B2
(45) Date of Patent: Jun. 7, 2016

(54) METHOD FOR PROVIDING SECOND SCREEN INFORMATION

(71) Applicant: INSTITUTE FOR INFORMATION INDUSTRY, Taipei (TW)

(72) Inventors: Wen-shan Liou, New Taipei (TW); Shih-Peng Lin, Yilan County (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 81 days.

(21) Appl. No.: 14/224,277

(22) Filed: Mar. 25, 2014

(65) Prior Publication Data

US 2015/0172755 A1      Jun. 18, 2015

(30) Foreign Application Priority Data

Dec. 18, 2013   (TW) .............................. 102146995 A

(51) Int. Cl.
| | | |
|---|---|---|
| *H04N 21/442* | (2011.01) | |
| *H04N 21/41* | (2011.01) | |
| *H04N 21/81* | (2011.01) | |
| *H04N 21/4223* | (2011.01) | |
| *H04N 21/422* | (2011.01) | |
| *H04N 21/4722* | (2011.01) | |
| *H04N 21/462* | (2011.01) | |
| *H04N 21/6543* | (2011.01) | |

(52) U.S. Cl.
CPC ..... *H04N 21/44218* (2013.01); *H04N 21/4122* (2013.01); *H04N 21/4126* (2013.01); *H04N 21/4223* (2013.01); *H04N 21/42203* (2013.01); *H04N 21/4424* (2013.01); *H04N 21/4622* (2013.01); *H04N 21/4722* (2013.01); *H04N 21/6543* (2013.01); *H04N 21/8133* (2013.01)

(58) Field of Classification Search
None
See application file for complete search history.

(56) References Cited

U.S. PATENT DOCUMENTS

| | | | |
|---|---|---|---|
| 8,732,275 | B2 * | 5/2014 | Roberts et al. ................ 709/219 |
| 2013/0014158 | A1 | 1/2013 | Bhatia et al. |
| 2013/0036200 | A1 * | 2/2013 | Roberts et al. ................ 709/219 |
| 2013/0252597 | A1 * | 9/2013 | Jin et al. ........................ 455/418 |
| 2014/0201767 | A1 * | 7/2014 | Seiden et al. ................... 725/12 |
| 2014/0282669 | A1 * | 9/2014 | McMillan ....................... 725/19 |
| 2014/0317646 | A1 * | 10/2014 | Garza et al. .................... 725/12 |

OTHER PUBLICATIONS

Taiwan Patent Office, Office action issued on Jul. 24, 2015.

* cited by examiner

*Primary Examiner* — Ricky Chin
(74) *Attorney, Agent, or Firm* — Li & Cai Intellectual Property (USA) Office

(57) ABSTRACT

A method for providing the second screen information is disclosed. The second screen information is used to be displayed on a portable device which includes a plurality of application software. While a link between the display equipment and a server is established, an environment data is generated by one of the display equipment and the portable device according to a using information where a user is viewing the display equipment. According to the environment data, the portable device may receive network information, which is sent out by the server, to execute one of the application software of the mobile device.

14 Claims, 6 Drawing Sheets

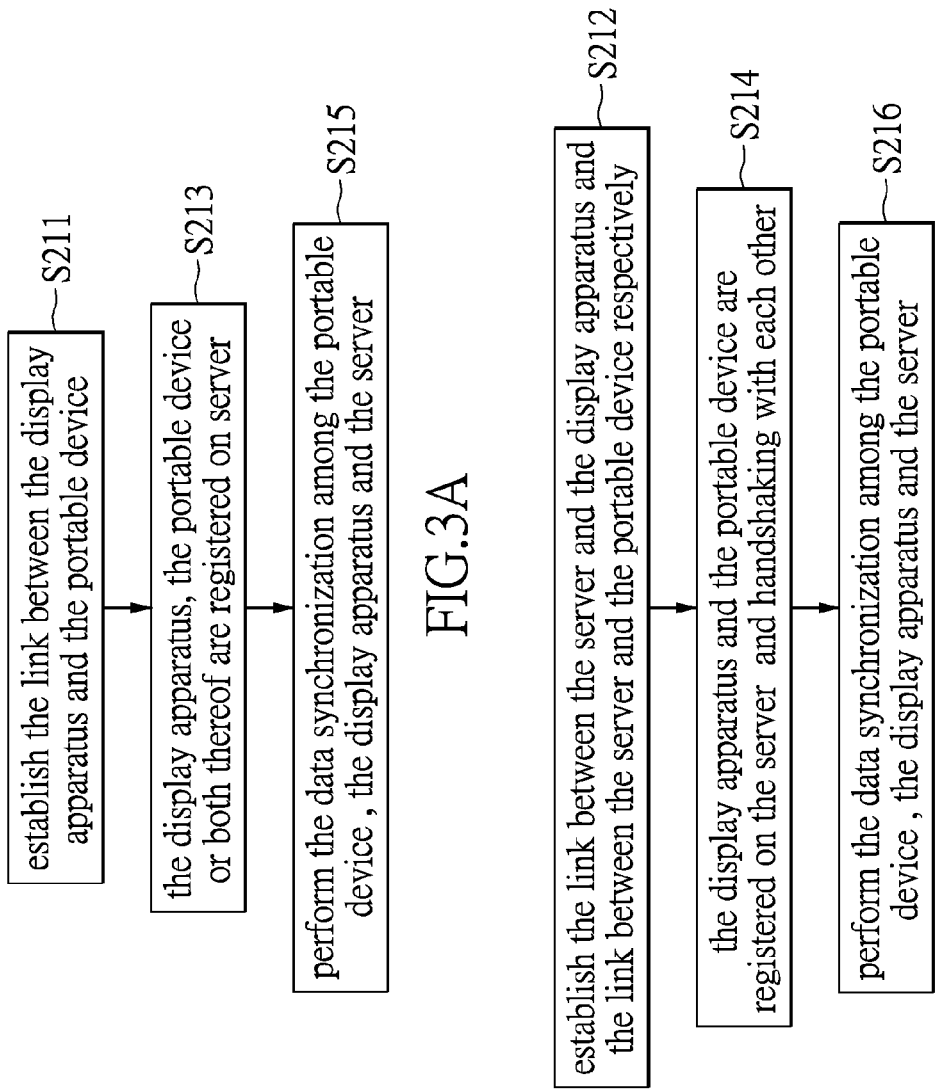

METHOD FOR PROVIDING SECOND SCREEN INFORMATION

BACKGROUND OF THE INVENTION

1. Field of the Invention

The instant disclosure relates to a method for providing second screen information; in particular, to a method for providing second screen information according to the user's status.

2. Description of Related Art

As the portable device such as smartphone, tablet or personal digital assistant are more widely used, the consumer can receive many kinds of the image and video information, such as TV programs, movies, concert or live broadcast game show, through the internet. In comparison with the traditional television, the portable device has more advantages of selection and convenience for collecting the information, which makes people get in the habit of obtaining information through the portable device.

For large number of the users owning smartphone or tablet, they may still use their smartphone or tablet ahead of the television while watching the TV programs. Thus, some businessmen try to develop the application software (App). When watching the TV program, the user can receive the information about the TV program by launching the application software through the portable device. That is, the user not only watches the TV program on a display screen, but also obtains the information relative to the TV program on a "second screen" of the portable device. The information is, for example, the preview, the relative activity message, the information about the main lead and so on. As such, it can save the time for the user to search the information through the internet by keywords. In addition, the information displayed on the second screen may more satisfy the user's demand. The advertisement company may market their products to the users through the combination of the TV programs and the ads displayed on the second screen of the portable phone.

However, for the conventional technique, if the user wants to obtain the second screen information relative to the TV program, the user has to search and download the application software after watching the TV program. It is inconvenient for the user to search and download the application software while the user is enjoying viewing the TV program. Moreover, the user may have to download different application software for different channel or programs, which may reduce the user's desire for receiving the second screen information. In addition, once the application software is launched on user's portable device, the second screen of the portable device may continue to display the information relative to the TV program whether the user is on the phone or not.

SUMMARY OF THE INVENTION

The object of the instant disclosure is to provide a method for providing the second screen information, and one of the application software installed on a portable device may be selected to be launched according to user's status and the environment where the user is viewing the display apparatus.

In order to achieve the aforementioned objects, according to an embodiment of the instant disclosure, a method for providing the second screen information, which may be displayed by a portable device, is disclosed. A plurality of application software has been installed on the portable device. The method includes the steps of generating an environmental data by at least one of display apparatus and the portable device according to a using information when a link between a display apparatus and a server is established; and determining whether the portable device receives a network information sent out by the server according to the environmental data.

The method of the instant disclosure can decide whether the second screen information is received by the portable device according to a using state, which means the state of a user who is viewing the display apparatus. In addition, one of the application software which has been installed on the portable device may be selected to be executed to display the second screen information. That is, the executed application software has been installed on the portable device. As such, the user does not need to download additional application software for a specific TV program.

In order to further the understanding regarding the instant disclosure, the following embodiments are provided along with illustrations to facilitate the disclosure of the instant disclosure.

BRIEF DESCRIPTION OF THE DRAWINGS

FIG. 3A shows a flow chart for initialization process according to an embodiment of the instant disclosure;

FIG. 3B shows a flow chart for initialization process according to another embodiment of the instant disclosure;

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
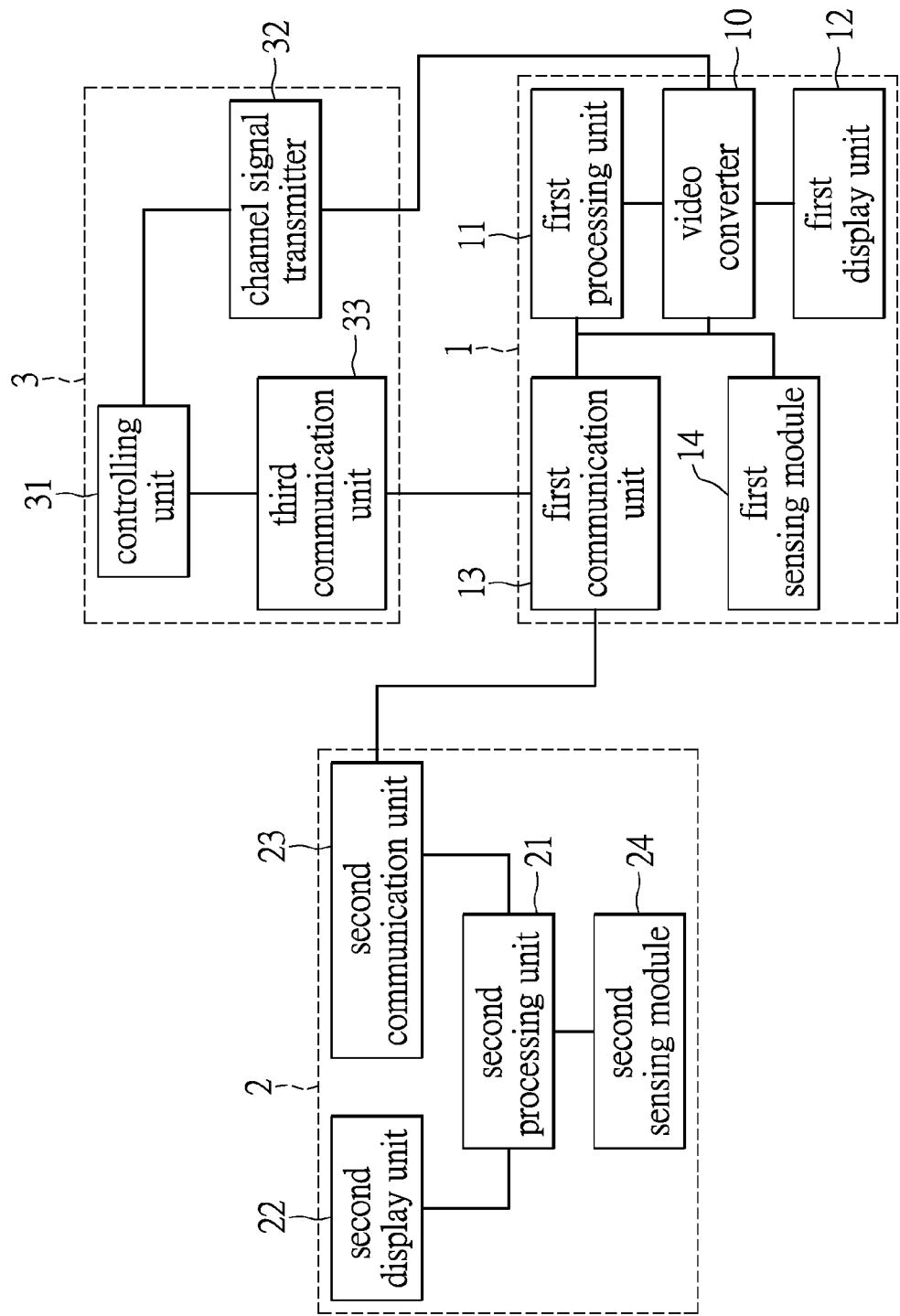
FIG. 1 shows a function block diagram of a system for providing second screen information according to an embodiment of the instant disclosure.
Figure 2:
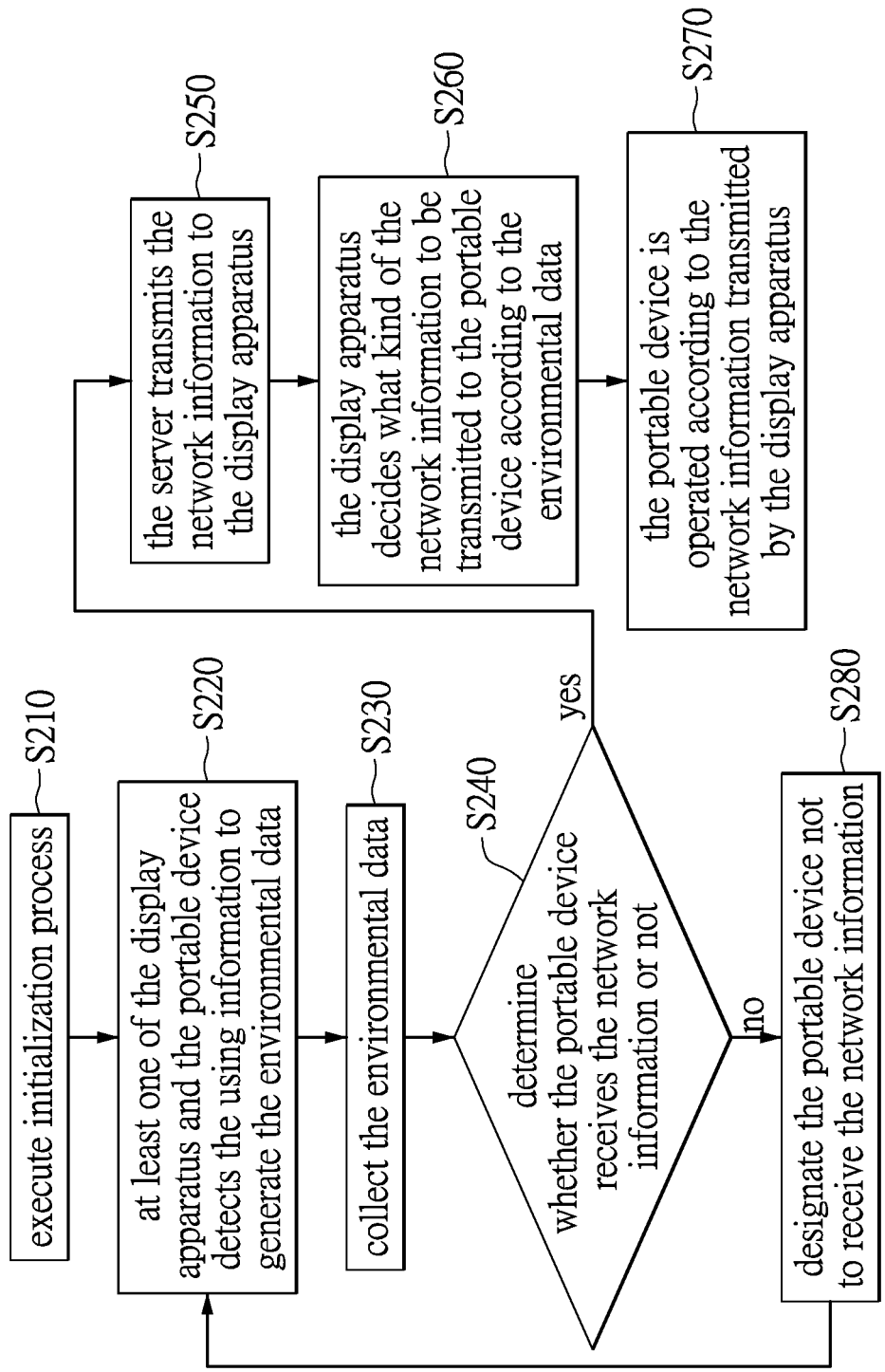
FIG. 2 shows a flow chart of a method for providing second screen information according to an embodiment of the instant disclosure.

Please refer to FIG. 1 and FIG. 2. FIG. 1 is a function block diagram of a system for providing second screen information according to an embodiment of the instant disclosure, and FIG. 2 shows a flow chart of a method for providing second screen information according to an embodiment of the instant disclosure. The system for providing second screen information includes a display apparatus 1, a portable device 2 and a server 3. By using the method for providing the second screen information in accordance with an embodiment of the instant disclosure, the server 3 may determine whether the server 3 transmits signal to portable device 2 according to a using condition of a user viewing the display apparatus 1. The second screen information is displayed by the portable device 2.

Please refer to FIG. 1. The display apparatus 1, for example a smart TV, a computer or a television equipped with a set-top box, can receive the program signal sent by the server 3 and display. In the embodiment of the instant disclosure, the display apparatus 1 is a smart TV for description. The display apparatus 1 includes a video converter 10, a first processing unit 11, a first display unit 12, a first communication unit 13 and a first sensing module 14, which are linked to each other.

The first communication unit 13 is used to establish a communication with an external device so that a signal can be communicated therebetween. The external device may be a smartphone, a tablet, a personal digital assistant (PDA) or a server. In the instant embodiment, the display apparatus 1 is linked with the portable device 2 through the first communication unit 13. The first communication unit 13 is capable of transferring data from the portable device 2 to the first processing unit 11.

The video converter 10 can receive and decrypt the program signal, and then convert the decrypted program signal to program content. The program content would be displayed through the first display unit 12. The program signal, such as analogous or digital signal, may be transmitted by cable, satellite antenna, broadband Internet, or terrestrial broadcast. In addition, the video converter 10 is for example a set-top box (STB) or circuitry in a television, and the television is such as an analog or digital television.

The first sensing module 14, for example an image capturing unit, an audio input unit or a combination thereof, is used for sensing the using information when the user is watching the display apparatus 1 to generate an environmental data. The image capturing unit is for example a camera or a video recorder, and the audio input unit may be an acoustic transducer, such as microphone. The environmental data for example includes surrounding image and/or background sound. The surrounding image can be captured by the image capturing unit, and the background sound can be detected by the audio input unit. The first sensing module 14 is linked to the first processing unit 11 so that the environmental data can be transferred to the first processing unit 11. The audio input unit may capture the audio frequency from the background sound by Fourier transform after receiving the background sound. In addition, the portable device 2 may include the abovementioned audio input unit.

The first processing unit 11 may include one or more processors, controllers, microprocessor, microcontroller, application-specific integrated circuit, digital signal processor、programmable logic device (PLD), field programmable gate array (FPGA) and memory or any combination thereof. In one embodiment, the first processing unit 11 may receive and analyze the environmental data collected by the first sensing module 14. Moreover, the first processing unit 11 may upload the environmental data to the server 3, and download the network information form the server 3 through the first communication unit 13. In addition, the first processing unit 11 can receive a user command, and control the channel received by the video converter 10 according to the user command. For example, the first processing unit 11 receives the channel switching command inputted by the user and switch to the channel assigned by the user.

The portable device 2 is for example a smartphone, a tablet computer, a personal digital assistant, a smart watch, a laptop, and so on. The portable device 2 includes a second processing unit 21, a second display unit 22, a second communication unit 23 and a second sensing unit 24, which are linked to each other. In addition, since the portable device 2 may be a smartphone in the instant embodiment, the portable device 2 may further includes a communicating unit (not shown) for providing the user with the function of telephoning. The second communication unit 23 may make a link be established between the portable device 2 and the display apparatus 1 or between the portable device 2 and the server 3. The technique for linking the portable device 2 to the display apparatus 1 may be carried out by wire or wireless techniques. The wire technique is for example a Bluetooth transmission, a WiFi transmission or an Infrared transmission. In addition, the portable device 2 may be linked to the server 3 through the network so that a signal can be communicated therebetween.

The second sensing unit 24 is used for sensing the using information whether the user is using the portable device 2 or not. The second sensing unit 24 may include an image capturing unit, a G-sensor, a gyroscope or the combination thereof. For example, the second sensing unit 24 may capture the surrounding image by the image capturing unit, and transmit the surrounding image to the second processing unit 21. The second processing unit 21 processes the surrounding image to determine whether the user is using the portable device 2. Specifically, the second processing unit 21 may analyze the surrounding image to identify a user object, such as a face image, an iris image or a human body image, and to determine the user object is represented in the surrounding image.

In another case, the second sensing unit 24 may detect whether the portable device 2 is still by using the G-sensor or the gyroscope. If the G-sensor or the gyroscope detects the portable device 2 has been still for a while, it denotes the portable device 2 has been idle.

The second processing unit 21 can store a situation detection module, an executing module and a plurality of application software, which may be independent App. or a library. From a functional perspective, the aforementioned application software is such as browser, media player, audio player, word processing software and social program. The social program may be Facebook, google+, Twitter and so on.

The situation detection module is used for detecting what application software is lunched and detecting what mode the portable device 2 is set. For example, the situation detection module can detect whether the portable device 2 is executing the communication program, or obtain the portable device 2 is in normal mode or in silent mode.

The executing module may launch a correspondingly application software according to a command. For example, when the second processing unit 21 receives a video data, such as MP4, AVI or MPG format video files, and a command indicating to execute the media player to read the video data, the executing module would launch the media player and display the video data. The second display unit 22 receives the signal transmitted by the second processing unit 21 to represent the information to the user. The second display unit 22 may be the screen of the portable device 2, and the information shown to the user may come from the abovementioned video data.

The server 3 may be built in cable television companies, television Production Company, satellite TV Signal Company, Advertisement Company, game development company or game company. In the embodiment of the instant disclosure, the server 3 includes a controlling unit 31, a channel signal transmitter 32 and a third communication unit 33. The controlling unit 31 is linked to the channel signal transmitter 32 and the third communication unit 33, respectively. Moreover, in one embodiment, the signal (for example a command) can be transmitted between the server 3 and the display apparatus 1 through the third communication unit 33.

The channel signal transmitter 32 is used for transmitting the program signal to the display apparatus 1. Specifically, the channel signal transmitter 32 transmits a multi-channel program signal at one time to the video converter 10 of the display apparatus 1. It is worth to mention that the first processing unit 11 of the display apparatus 1 receives the channel command inputted by the user and controls the video converter 10 to convert the program signal on the assigned channel to television content according to the channel command. Moreover, the first processing unit 11 continues to transmit a channel signal which indicating the channel assigned by the user to the server 3. That is to say, the controlling unit 31 can uninterruptedly receive the channel signal through the third communication unit 33 to know what channel the user selects at present.

The controlling unit 31 may include one or more processors, controllers, microprocessor, microcontroller, application-specific integrated circuit, digital signal processor、programmable logic device (PLD), field programmable gate array (FPGA) and memory or any combination thereof. In one embodiment, the controlling unit 31 stores many sets of the network information, which are corresponding to different program information.

Each set of the network information includes a plurality of the second screen information and/or commands. The second screen information may be a video file, an image file (such as JPG, GIF, or BMP format file) and/or a text file, such as TXT, DOC or PDF format file. The second screen information may be relative to the main lead of the program, the program trailer, the activities about the program (for example autograph signing event or concert) or the advertisement of the program peripheral merchandise which is endorsed by the male or female lead, etc. The network information may include the command for connecting the specific internet address or for assigning the application software to display the second screen information. The domain name of the specific internet address may contain youtube, facebook, google+ or twitter.

In addition, the controlling unit 31 can receive the environmental data transmitted by the display apparatus 1 and/or the portable device 2. As the mentioned previously, the environmental data can be generated by at least one of the display apparatus 1 and the portable device 2. In addition, after receiving the environmental data, the controlling unit 31 can determine whether the network information should be transmitted to the display apparatus 1 or the portable device 2 according to the environmental data. When the controlling unit 31 determines that the network information can be received by the portable device 2, the controlling unit 31 transmits corresponding network information according to the channel signal. That is, the network information may relate to the television program.

Please refer to FIG. 2, which illustrates a flow chart of a method for providing second screen information according to an embodiment of the instant disclosure. FIG. 2 shows the process for providing second screen information through the cooperation of the display apparatus 1, the portable device 2 and the server 3. Firstly, in step S210, the initialization process is executed. In the initialization process, the links among the display apparatus 1, the portable device 2, and the server 3 are established. In an embodiment of the instant disclosure, the links may be established by wire or wireless communication protocol which may be provided by WiFi, WíMax, Long Term Evolution (LTE) and so on.

Please refer to FIG. 3A, which shows a flow chart for initialization process according to an embodiment of the instant disclosure. In the example shown in FIG. 3A, the initialization process includes performing the steps S211, S213 and S215. In step S211, the display apparatus 1 is linked to the portable device 2. Specifically, the link between the display apparatus 1 and the portable device 2 is established with certification procedure and data synchronization for enabling handshaking between the display apparatus 1 and the portable device 2. The certification procedure and data synchronization may be executed by the application software stored in the first processing unit 11 and the second processing unit 21. In addition, the display apparatus 1 can be used as a PPPoE server or a push message server and linked to the portable device 2. The PPPoE server can support the current mainstream point-to-point protocol such as UPnP or Bonjour protocol.

In step S213, the display apparatus 1, the portable device 2 or both thereof are registered on server 3. In the embodiment of the instant disclosure, the display apparatus 1 is registered on the server 3. The registration procedure includes the steps of identifying the account number and password transmitted by the display apparatus 1. The account number and password may be set by the user through software stored in the display apparatus 1 or the portable device 2. The software may be a firmware or program stored in the display apparatus 1 or in the portable device 2 in advance, or downloaded by the user from the internet. As such, the links between the first processing unit 11 and the controlling unit 31 can be established and enable the data of the portable device 2, which is in handshaking with the display apparatus 1, to be transmitted to the controlling unit 31.

In step S215, the data synchronization is performed among the portable device 2, the display apparatus 1 and the server 3. For example, the portable device 2 transmits an App list to the server 3 or to the display apparatus 1. Specifically, the second processing unit 21 may transmit the App list to the display apparatus 1, and then the display apparatus 1 transmits the App list to the server 3. In the other embodiment, when the portable device 2 is linked to the server 3 through the display apparatus 1, the second processing unit 21 may transmit the App list to the first processing unit 11. However, in this case, the App list may not be transmitted to the server 3 by the first processing unit 11. The more detail information about the application software which is installed on the second processing unit 21 currently may be listed in the App list. For example, the format which the portable device 2 can support is listed on the App list. In other embodiment, the App list may only list the application software which the user wants to provide to the server 3. That is, the user can select which application software listed on the App list.

Please refer to FIG. 3B, which shows a flow chart for initialization process according to another embodiment of the instant disclosure. In the instant embodiment, the initialization process includes performing the steps S212, S214 and S216. In step S212, the link between the server 3 and the display apparatus 1 and the link between the server 3 and the portable device 2 are established, respectively. In this case, the display apparatus 1 is not linked to the portable device 2.

In step S214, the display apparatus 1 and the portable device 2 are registered on the server 3 and handshaking with each other. Specifically, when the display apparatus 1 and the server 3 are linked to each other, the display apparatus 1 transmits an identification data to the server 3, and the portable device 2 is handshaking with the display apparatus 1 in the registration and handshaking procedure. The handshaking procedure for example includes the following steps. The portable device 2 sends a handshaking data to the server 3. The handshaking data may have an identification data of the portable device 2 and the serial number or the IP address of the display apparatus 1. In step S216, the data synchronization is performed among the portable device 2, the display apparatus 1 and the server 3. At the meanwhile, the portable device 2 may transmit the App list to the server 3 in this case.

When the user turns on the display apparatus 1, the server 3 may transmit the program signal to the display apparatus 1 so that the user can view the show displayed by the display apparatus 1. In another case, the program signal is not necessary sent by the server 3, however, after receiving the program signal, the display apparatus 1 transmit a channel signal to the server 3 to inform which channel the user is watching.

Please refer to FIG. 2 again, in step S220, at least one of the display apparatus 1 and the portable device 2 may detect the using information to generate the environmental data. The using information may include the user's status or the user's surrounding while the user is viewing the display apparatus 1. For example, the display apparatus 1 may detect whether the user is in front of the display apparatus 1 to determine whether the user is watching the program displayed by the display apparatus 1. In addition, the display apparatus 1 may detect whether the user fixes his gaze on the display apparatus 1 or whether the user's surrounding is quiet or not.

In one embodiment, the environmental data may include a first environmental data and a second environmental data. The display apparatus 1 detects the user's status while the user is watching the display apparatus 1, thereby collecting the first environmental data. The portable device 2 detects the user's status while the user uses the portable device 2, thereby collecting the second environmental data. Accordingly, the first environmental data may be provided by the display apparatus 1, and the second environmental data may be provided by the portable device 2. That is, in step S220, the first environmental data can be obtained by using the display apparatus 1 to detect the user's status while the user is viewing the display apparatus 1, and the second environmental data can be obtained by using the portable device 2 to detect the user's status while the user is using the portable device 2.

For example, the steps for generating the first environmental data may include capturing the surrounding image by the first sensing module 14 and analyzing surrounding image to obtain the user's status of using the display apparatus 1. The aforementioned surrounding image is transmitted to the first processing unit 11, and the surrounding image is analyzed by the first processing unit 11 to determine whether the user object, such as a face image, an iris image or a human body image, is shown in the surrounding image.

In addition, the steps for generating the first environmental data may further include capturing the background sound by the first sensing module 14. In this case, the background sound is captured by the audio input unit (for example acoustic transducer). The background sound is transmitted to the first processing unit 11, and analyzed by the first processing unit 11. For instance, to analyze whether volume of the background sound is larger than a predetermined value, for example: 80 decibels. When the volume of the background sound exceeds the predetermined value, the first processing unit 11 sent out a reminder message or static network information. The reminder message may include voice message and/or vibrating message for asking the user whether the network information produced by the server 3 should be received or not. When the volume of the background sound is smaller than the predetermined value, the first processing unit 11 can sent out static network information or dynamic network information.

On the other hand, if the user is using the portable device 2, for example the user is communicating with others or playing the game, although the user may gaze the display apparatus 1, the user does not concentrate on the program content in actual case. It is thus the portable device 2 is used to detect the current using information whether the user is using the portable device 2 so as to indirectly obtain the user's status when the user views the display apparatus 1. Specifically, the portable device 2 may detect the application software in the execution, such as communication program or game App., by using the situation detection module stored in the second processing unit 21. As such, the user's status where the user uses the display apparatus 1 may be obtained indirectly by the detection of the portable device 2.

In another embodiment, the steps of generating the second environmental data may include capturing an iris image by the second sensing unit 24, and analyzing the iris image by the second processing unit 21 to determine whether the user is paying attention to the portable device 2. The second processing unit 21 may analyze the iris image by eye tracking technique, which can determine the gaze of the user from the moving direction of the eyeball. In addition, in another embodiment, the steps for generating the second environmental data may include analyzing incline variation data of the portable device 2 by the G-sensor or the gyroscope of the second sensing unit 24 to determine whether the portable device 2 is in idle state or not, for further obtaining the user's status where the user uses the portable device 2.

In steps S230, the environmental data is collected. In the case that the portable device 2 is linked to the server 3 through the display apparatus 1, there are two aspects. One of the aspects is that the environmental data detected by the portable device 2 and the display apparatus 1 would be transmitted to the server 3 in step S230. The environmental data may include the first environmental data and the second environmental data. Specifically, the second environmental data detected by the portable device 2 would be transmitted to the display apparatus 1 firstly, and then the display apparatus 1 transmitted both of the first and the second environmental data to the server 3. That is, the first processing unit 11 may receive the second environmental data, and transmits the second environmental data and the first environmental data to the controlling unit 31. In addition, the first and the second environmental data may be communicated to the server 3 through the internet. The following step S240 would be performed by the server 3 according the environmental data.

In another example, the second environmental data detected by the portable device 2 may be transmitted to the display apparatus 1, in step S230. The following step S240 may be executed by the display apparatus 1 according to the first environmental data and the second environmental data.

However, in another embodiment, the portable device 2 and the server 3 may directly communicate with each other without through the display apparatus 1. In this case, since the direct communication between the portable device 2 and the server 3 is established, in the step S230, the environmental data detected by the portable device 2 can be uploaded to the server 3 directly. In addition, the environmental data detected by the display apparatus 1 may also transmitted to the server 3. That is, the first processing unit 11 and the second processing unit 21 transmit the first environmental data and the second environmental data, respectively, to the server 3.

Figure 4A:
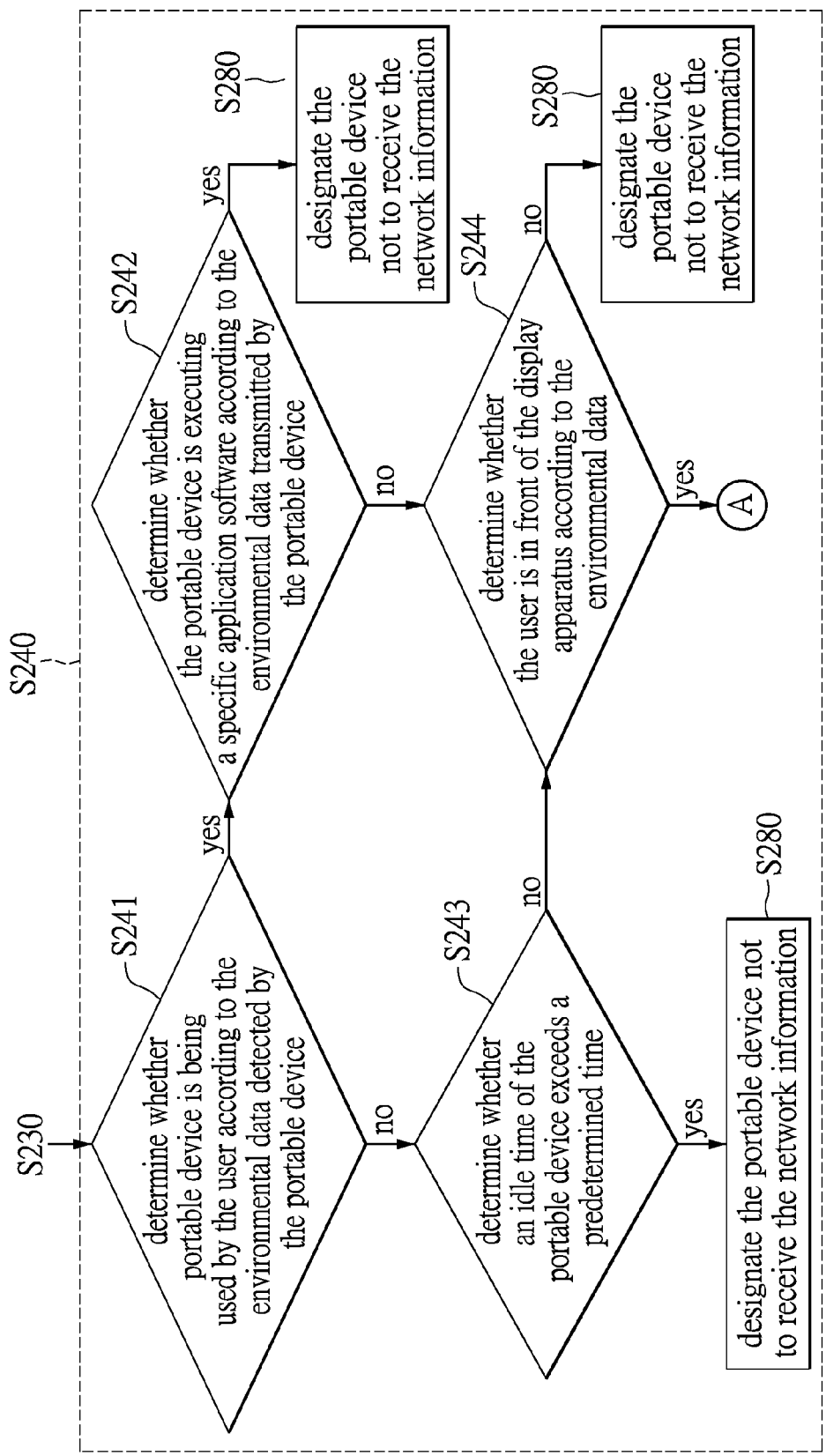
FIG. 4A shows a flow chart for judging whether the portable device receives the network information by the server or the display apparatus.

In step S240, whether the portable device 2 receives the network information or not is determined. In an embodiment of the instant disclosure, the step S240 may be performed by the server 3 or the display apparatus 1. Please refer to FIG. 4A, which shows a flow chart for judging whether the portable device receives the network information by the server or the display apparatus. The method for determining whether the portable device 2 receives the network information according to the environmental data has two stages. FIG. 4A also illustrates the flow chat of the first stage in the step S240. Firstly, in step S241, whether the portable device 2 is being used by the user according to the environmental data detected by the portable device 2 is determined. Specifically, according to the second environmental data (for example the iris image or the incline variation), the server 3 or the display apparatus 1 may determine whether the user is paying attention to the portable device 2; if yes, perform the step S242 and if not, perform the step S243.

In step S242, the server 3 may determine whether the portable device 2 is executing specific application software according to the environmental data transmitted by the portable device 2. As mentioned previously, the situation detection module can detect what application software the portable device 2 is currently executing. The aforementioned specific application software is for example a voice or text communication program. If the server 3 or display apparatus 1 determines the portable device 2 is executing the specific application software, proceed to step S280. In the step S280, the portable device 2 is not designated to receive the network information. That is, the portable device 2 does not receive the network information transmitted by the display apparatus 1 or the server 3. If the server 3 or display apparatus 1 determines the specific application software is not executed by the portable device 2, proceed to the step S244.

If the abovementioned determination is performed by the server 3, when the server 3 determines that the portable device 2 does not adapt to receive the network information, the server 3 would not send out the network information to the display apparatus for to the portable device 2. If the abovementioned determination is performed by the display apparatus 1, the server 3 would send out the network information to the display apparatus 1 at different time. When the display apparatus 1 determines the portable device 2 does not adapt to receive the network information, the display apparatus 1 would not transmit the network information, which is sent out by the server 3, to the portable device 2. In another embodiment, the portable device 2 can determine itself whether or not to receive the network information. That is, in the abovementioned embodiments, if the determination that the portable device does not adapt to receive the network information is made, the step S280 would be performed, i.e., the portable device would not receive the network information. In addition, in the abovementioned embodiments, all of the network information is initially provided by the server 3.

In step S243, determine whether an idle time of the portable device 2 exceeds a predetermined time according to the environmental data provided by the portable device 2. In this step, the server 3 or the display apparatus 1 may make a determination in accordance with the second environmental data received at different time. If the server 3 or the display apparatus 1 determines that the idle time of the portable device 2 exceeds the predetermined time, the step S280 would be performed, i.e., the portable device 2 would not receive the network information 2; if not, the step S244 is proceeded.

In step S244, whether the user is in front of the display apparatus 1 according to the environmental data is determined. In this embodiment, it is worth to explain that an assumption is made that only one user is in front of the display apparatus 1, and the user is also the owner of the portable device 2. Specifically, in the instant embodiment, the first sensing module 14 (for example the image capturing unit) is used for capturing the surrounding image. The surrounding image then is transferred to the server 3 or the display apparatus 1. The server 3 or the display apparatus 1 is used for analyzing the surrounding image to determine whether the user object is represented and to determine that the user is in front of the display apparatus 1. In this step, the user object may be a human body image. Moreover, when the server 3 or the display apparatus 1 determine that the user is not in front of the display apparatus 1, the step S280 is performed, that is, the portable device 2 does not receive the network information.

When the server 3 or the display apparatus 1 determines that the user is in front of the display apparatus 1, the following steps proceed. As mentioned previously, the controlling unit 31 of the server 3 can receive the channel signal transmitted by the first processing unit 11 to know what channel received by the display apparatus 1 currently. It is thus the controlling unit 31 of the server 3 may analyze the channel signal to find out what program is being shown on the display apparatus 1. As such, the controlling unit 31 of the server 3 can transmit a set of the network information to the display apparatus 1 or portable device 2 according to the program that is to be broadcast on the selected channel during a time zone. In addition, the server 3 or the display apparatus 1 may further determine what kind of the network information in the next stage.

Figure 4B:
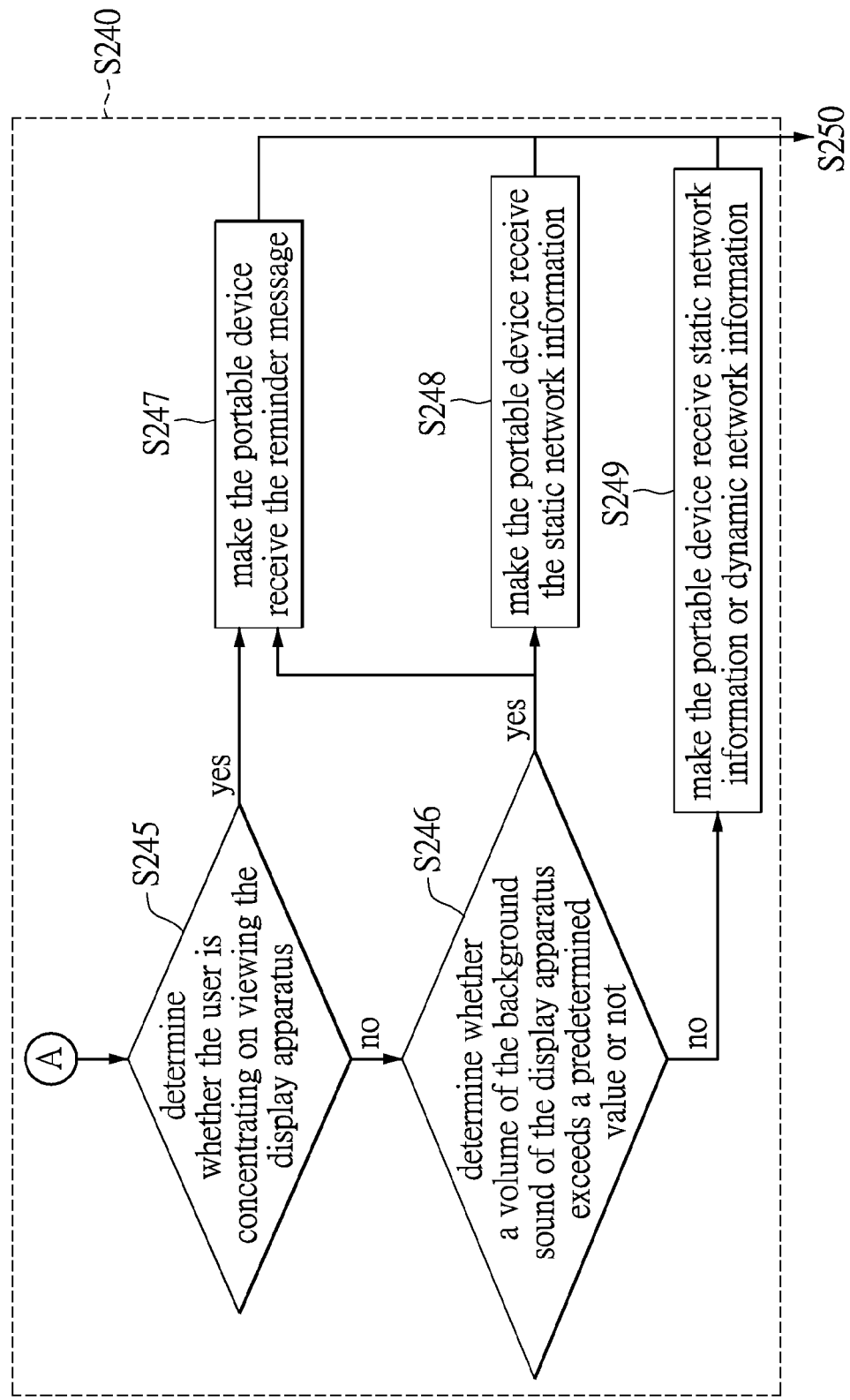
FIG. 4B shows a flow chart for determining what kind of the network information received by the portable device.

Please refer to FIG. 4B, which shows the flow chat of the method for determining what kind of the network information would be received by the portable device 2. The method may be executed by the server 3 or the display apparatus 1. Following the step S244, the step S245 is performed. In step S245, the server 3 or the display apparatus 1 determines whether the user is concentrating on viewing the display apparatus 1 according to the first environmental data gathered by the display apparatus 1. In step S245, the user object may be an iris image or a face image. For example, the server 3 or the display apparatus 1 may analyze the iris image by the eye tracking technique to substantially investigate whether the user is gazing at the display apparatus 1. If the server 3 or the display apparatus 1 obtains the result that the user's gaze points to the display apparatus 1 and stays for a certain period of time, it can be sure that the user is concentrating on viewing the display apparatus 1. At this time, the step S247 may be performed. In step S247, make the portable device 2 receive the reminder message. That is, the server 3 or the display apparatus 1 may send the reminder message to the portable device 2 before providing the network information to ask whether the user wants to receive the network information produced by the server 3. The reminder message may include voice message and/or vibrating message.

If the server 3 or the display apparatus 1 investigates that the user dose not concentrate on viewing the display apparatus 1, it is likely that the user is playing their portable device 2, and thus the step S246 is performed. In step S246, whether a volume of the background sound of the display apparatus 1 exceeds a predetermined value or not is determined. The background sound of the display apparatus 1 means the sound of the environment where the display apparatus 1 is arranged. In another case, the execution of the step S246 may follow the step S230.

In step S246, the server 3 or the display apparatus 1 according to the volume of the background sound determines what kind of the network information would be provided to the portable device 2. For example, when the volume of the background sound exceeds 80 decibels, which is analyzed by the server 3 or the display apparatus 1, the assumption would be made that the user is viewing the display apparatus in a noisier environment. It is hence the step S247 or the step S248 may be performed by the server 3 or the display apparatus 1. As mentioned previously, in step S247, make the portable device 2 receive the reminder message. In step S248, make the portable device 2 receive the static network information. That is, the server 3 or the display apparatus 1 may transmit the static network information to the portable device 2. If the volume of the background sound is smaller than 80 decibels, it is likely that the user is viewing the display apparatus 1 in a quieter environment.

As a result, when the server 3 analyzes the environmental data and obtains that the volume of the background sound is smaller than 80 decibels, the step S249 may be performed. In step S249, make the portable device 2 receive static network information or dynamic network information. That is, the server 3 or the display apparatus 1 may transmit static network information or dynamic network information to the portable device 2. The static network information is for example an image and text information, and the dynamic network information is for example video information.

In addition, the server 3 or the display apparatus 1 may determine whether to transmit the network information not only according to the environmental data but also according to preset time. For instance, for a program broadcast in one channel, such as a singing contest program, the controlling unit 31 would send out a set of the network information including a first network information and a second network information. The first network information is for example the background information about all of the participants, and the second network information is for example activity information about the most popular singer vote. When the program is broadcast at a first preset time, the controlling unit 31 sends out the first network information. When the program continues to be broadcast for a second preset time, the controlling unit 31 sends out the second network information. That is to say, when the program is broadcast to a preset time, the server 3 or the display apparatus 1 determines whether the portable device 2 adapts to receive the network information or not according to the environmental data. However, if the program is not yet broadcast for the preset time (such as the first preset time or the second preset time), even the server 3 or the display apparatus 1 determines the portable device 2 adapts to receive the network information according to the environmental data, the controlling unit 31 or first processing unit 11 would not send any network information to the portable device 2.

In the abovementioned embodiment, the decision of transmitting the network information according to the environmental data is made by the server 3. In another embodiment, the decision may be made by the display apparatus 1, i.e., the display apparatus may decide whether the portable device 2 receives the network information or not. Specifically, the first processing unit 11 receives the second environmental data provided by the portable device 2, and the first environmental data measured by the first sensing module 14. The first processing unit 11 determines whether the portable device 2 receives the network information or not according to the first and the second environmental data. To sum up, either the server 3 or the display apparatus 1 can decide whether the portable device 2 receive the network information which is initially provided by the server 3.

Please refer to FIG. 2 again. In the embodiment of the instant disclosure, when it is be sure that the portable device 2 can receive the network information, the step S250 is performed. In step S250, the server 3 sends out the network information. Specifically, in one embodiment, the server 3 directly transmits the network information to the portable device 2. In another embodiment, the server 3 transmits the network information to the display apparatus 1, and then the display apparatus 1 make the portable device 2 perform the application software according to the network information. In addition, the server 3 may transmit one network information to the display apparatus 1 at one time, or transmit one set of the network information to the display apparatus 1. The communication of the network information may be carried out by using the cloud technology.

In the instant embodiment, the server 3 transmits one set of the network information to the first processing unit 11 at one time. Moreover, in step S260, the display apparatus 1 decides what kind of the network information to be transmitted to the portable device according to the environmental data. For example, the server 3 transmits all of the reminder message, static network information, and dynamic network information to the display apparatus 1 at a certain time, and the first processing unit 11 of the display apparatus 1 determines what kind of the network information would be received by the portable device 2 according to the processes shown in FIG. 4B (such as the steps S245 and S246).

In step S270, the portable device 2 receives the network information, and is operated according to the network information. In one embodiment, the network information includes the second screen information and a command. The command is used to control the portable device 2 to launch the application software which can read the second screen information. The portable device 2 has stored a plurality of the application software. After receiving the network information, the portable device 2 may execute one of the application software according to the network information so that the second screen information can be provided to the user.

In the instant embodiment, the server 3 transmits the network information to the portable device 2 through the display apparatus 1 so as to control the second processing unit 21 to execute the application software, and display the second screen information on the second display unit 22. In another embodiment, if the portable device 2 is directly links to the server 3, the server 3 may directly transmit the network information to the portable device 2 in the condition of without the display apparatus 1 to control the portable device 2 to display the second screen information. That is, in the embodiment of the instant disclosure, the steps S250 and S260 are not necessary steps and can be omitted.

In another embodiment, if the second processing unit 21 transmits the App list to the first processing unit 11, or the first processing unit 11 can detect the application software installed on the second processing unit 21, the network information, which is transmitted from the server 3 to the display apparatus 1, may only include the second screen information. After the display apparatus 1 receives the second screen information, the display apparatus 1 decides the portable device 2 should launch what kind of the application software to read the second screen information corresponding to the file format of the second screen information and the App list. In addition, the display apparatus 1 may issue a control command to the portable device 2 to control the portable device 2 to execute the application software. Specifically, after receiving the control command, the second processing unit 21 of the portable device 2 launches the corresponding application software by using the executing module in accordance with the control command, and controls the second display unit 22 to display the second screen information.

In another embodiment, if the network information only includes the second screen information provided by the server 3, the portable device 2 would determine itself which application is to be executed to show the second screen information. Specifically, the server 3 or the display apparatus 1 transmits the second screen information to the second processing unit 21, and then the second processing unit 21 directly launches the corresponding application software according to the file format of the second screen information. For example, if the file format of the second screen information is AVI, WMV, MOV, MP4 file format and the like, the second processing unit 21 would launch media player for displaying the second screen information. Furthermore, in another embodiment, the portable device 2 may determine whether receive the network information or not according to the situation in which the portable device 2 is used, for example the portable device 2 may be used by the user to communicate with the others.

Figure 5:
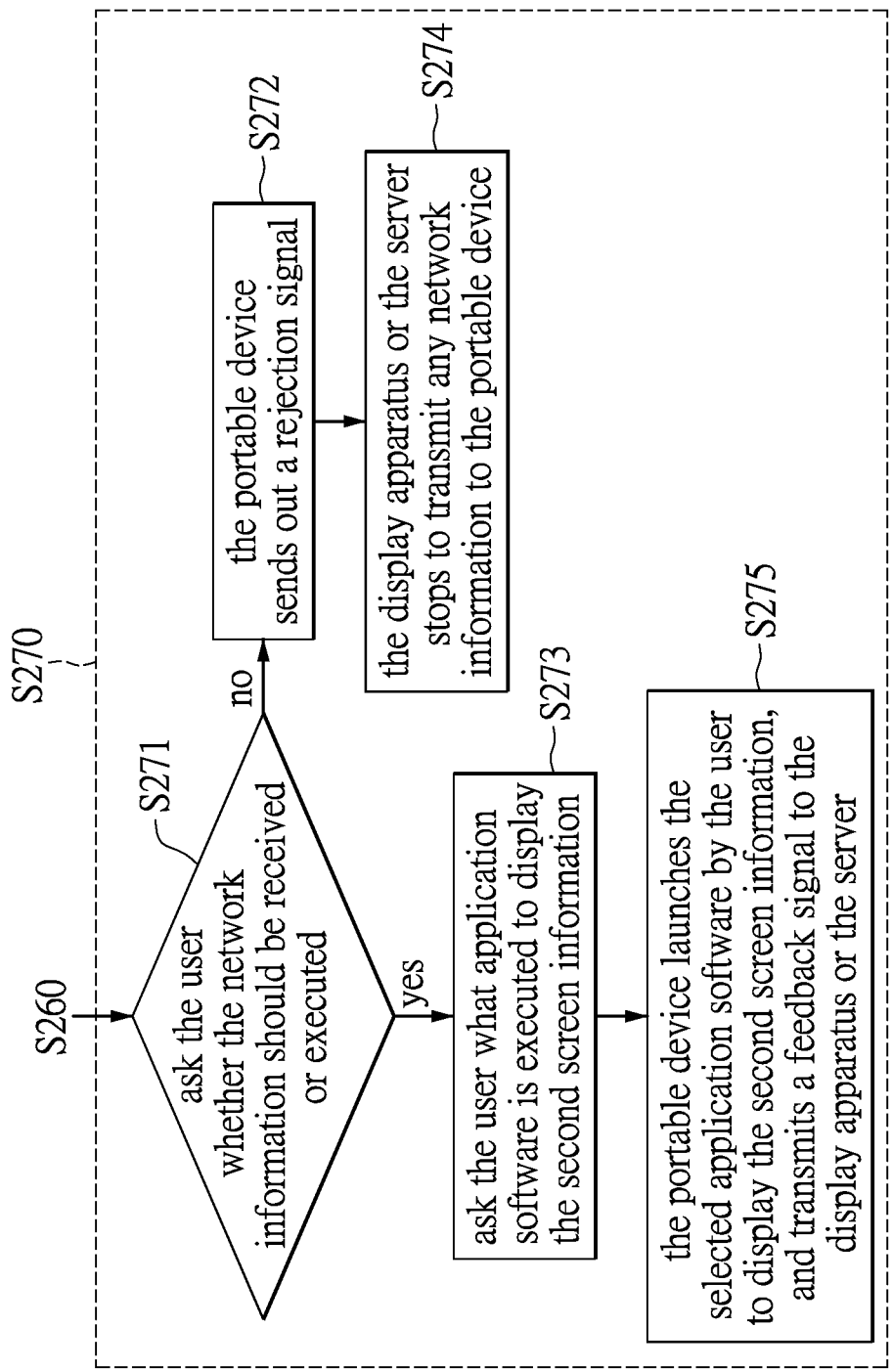
FIG. 5 shows a flow chart for executing the application software by the portable device according to the network information transmitted by the server or the display apparatus.

Please refer to FIG. 5, which shows a flow chart for executing the application software by the portable device according to the network information transmitted by the server or the display apparatus. Before the portable device 2 receives or executes the network information transmitted by the display apparatus 1, in step S271, the portable device may execute specific application software to ask the user whether the network information should be received or executed. If the user does not want the network information to be received or executed, the step S272 would be performed. In addition, if the user wants the network information to be received or executed, the step S273 would be performed. In step S272, the portable device 2 sends out a rejection signal to the display apparatus 1 or the server 3. Subsequently in step S247, the display apparatus 1 or the server 3 stops to transmit any network information to the portable device 2 when receiving the rejection signal.

On the contrary, if the user wants the network information to be received, in step S273, ask the user what application software is executed to display the second screen information. Specifically, assuming that the network information for example only includes the second screen information, the portable device 2 may store two or more kind of the application software all of which can read the second screen information. For example, assuming that the second screen information includes a URL link from which the video and audio content is accessible, the portable device 2 may open the URL link of the second screen information by browser or Youtube. In addition, the portable device 2 may ask the user what application software is executed to read the second screen information according to the file format of the second screen information. After the user selects the specific application software for reading the second screen information, the step S275 is performed.

In step S275, the portable device 2 not only launches the selected application software by the user to read the second screen information, but also transmits a feedback signal to the display apparatus 1 or the server 3. After receiving the feedback signal, the display apparatus 1 or the server 3 may directly indicate the portable device 2 to execute the selected application software to read the next second screen information according to the feedback signal. The next second screen information has the same file format as the previous second screen information. That is to say, in the method for providing the second screen information in accordance with an embodiment of the instant disclosure, the server 3 or the display apparatus 1 may accumulatively record the user's response to receive the network information. Consequently, the server 3 or the display apparatus 1 may transmit the network information which more meet the user's demands to the portable device 2.

In summary, in the method for providing the second screen information according to an embodiment of the instant disclosure, the server may provide the network information according to the situation where the user is viewing the display apparatus. In addition, the portable device can launch the application software to read the second screen information. The application software for read second screen information has been installed on the portable device. In this regard, it is not necessary for the user to download specific application software for each program to read the second screen information. It thus may save time for the user to search and download the specific application software. In addition, since the user needs not to download specific application software for each program to the portable device, the occupation of the storage capacity of the portable device may be reduced.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A method for providing second screen information, the second screen information is provided for a portable device to be displayed, the method comprising:

establishing links among a display apparatus, a portable device and a server, wherein the server receives a channel signal from the display apparatus to obtain a selected channel broadcasted through the display apparatus;

generating an environmental data according to a using information, wherein the environmental data is generated by at least one of the display apparatus and the portable device, wherein the display apparatus includes an image capturing unit, and the step of generating the environmental data includes capturing a surrounding image by using the image capturing unit;

analyzing the surrounding image to obtain the using information, wherein the step of analyzing the surrounding image includes determining whether a user object is represented in the surrounding image by a processing unit;

determining whether the portable device receives a network information according to the environmental data, wherein the network information is sent out by the server, and the network information includes at least one second screen information corresponding to the selected channel, wherein the step of determining whether the portable device receives the network information according to the environmental data includes designating the portable device to receive the network information when the user object is represented in the surrounding image;

after the portable device receives the second screen information, launching one of application software installed in the portable device to display the second screen information according to a file format of the second screen information, wherein the launched application software has been installed in the portable device before the portable device receives the second screen information;

wherein the step of generating the environmental data further comprises:

detecting a background sound by an audio input unit; and analyzing the background sound to obtain the using information;

wherein the step of analyzing the background sound comprises determining whether a value of the background sound exceeds a predetermined value; and transmitting a reminder message or a static information when the value of the background sound exceeds the predetermined value.

2. The method for providing second screen information according to claim 1, wherein at least one of the display apparatus and the portable device comprises the image capturing unit.

3. The method for providing second screen information according to claim 1, wherein the processing unit is integrated in the display apparatus, the server or the portable device.

4. The method for providing second screen information according to claim 1, wherein the step of analyzing the background sound further comprises transmitting a static network information or a dynamic network information when the value of the background sound does not exceed the predetermined value.

5. The method for providing second screen information according to claim 1, wherein at least one of the display apparatus and the portable device is equipped with the audio input unit.

6. The method for providing second screen information according to claim 1, further comprising establishing a link between the display apparatus and the portable device, wherein the portable device executes one of the application software installed on the portable device according to the network information.

7. The method for providing second screen information according to claim 6, wherein the server includes a controlling unit for sending out the network information and a channel signal transmitter linked to the display apparatus.

8. The method for providing second screen information according to claim 7, wherein the display apparatus includes a first processing unit for receiving the network information and transmitting a control command to the portable device so that the portable device executes one of the application software.

9. The method for providing second screen information according to claim 1, before the step of determining whether the portable device receives the network information further comprising: collecting the environmental data by at least one of the server and the display apparatus; and
determining whether to transmit the network information to the portable device according to the environmental data by at least one of the server and the display apparatus.

10. The method for providing second screen information according to claim 9, wherein the network information is transmitted from the server to the display apparatus, and transmitted to the portable device.

11. The method for providing second screen information according to claim 1, wherein the step of determining whether the portable device receives the network information further includes:
determining whether the portable device is being used;
determining whether the portable device is executing a specific application software; and
designating the portable device not to receive the network information when the portable device is being used and executing the specific application software.

12. The method for providing second screen information according to claim 11, wherein the step of determining whether the portable device receives the network information further includes:
determining whether a user is in front of the display apparatus according to the environmental data generated by the display apparatus when the portable device is being used and the specific application software is not executed; and
designating the portable device not to receive the network information when the user is not in front of the display apparatus.

13. The method for providing second screen information according to claim 1, wherein the step of determining whether the portable device receives the network information further includes:
determining whether the portable device is being used;
determining whether the portable device is idle for a predetermined time; and
designating the portable device not to receive the network information when the portable device is not being used and idle for the predetermined time.

14. The method for providing second screen information according to claim 13, wherein the step of determining whether the portable device receives the network information further includes:
determining whether a user is in front of the display apparatus according to the environmental data generated by the display apparatus when the portable device is not being used and not idle for the predetermined time; and
designating the portable device not to receive the network information when the user is not in front of the display apparatus.

\* \* \* \* \*